(12) United States Patent
Culp et al.

(10) Patent No.: US 8,929,585 B2
(45) Date of Patent: Jan. 6, 2015

(54) HAZARD DETECTION FOR ASSET MANAGEMENT

(75) Inventors: James R. Culp, Towson, MD (US); Frank D. Fenhagen, IV, Baltimore, MD (US); Arun Hampapur, Norwalk, CT (US); Xuan Liu, Yorktown Heights, NY (US); Sharathchandra U. Pankanti, Darien, CT (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 12/955,944

(22) Filed: Nov. 30, 2010

(65) Prior Publication Data

US 2012/0134527 A1 May 31, 2012

(51) Int. Cl.
*G06K 9/00* (2006.01)
*G06Q 90/00* (2006.01)

(52) U.S. Cl.
CPC ........................................ *G06Q 90/00* (2013.01)
USPC ........................................... 382/100; 382/103

(58) Field of Classification Search
None
See application file for complete search history.

(56) References Cited

U.S. PATENT DOCUMENTS

| | | | |
|---|---|---|---|
| 7,627,453 B2 | 12/2009 | Keefe et al. | |
| 7,738,612 B2 | 6/2010 | Rafaeli | |
| 7,746,794 B2 | 6/2010 | Sink | |
| 8,229,769 B1* | 7/2012 | Hopkins, III | 705/4 |
| 2005/0075911 A1* | 4/2005 | Craven, Jr. | 705/4 |
| 2007/0260401 A1* | 11/2007 | Sydor et al. | 702/1 |
| 2008/0082348 A1* | 4/2008 | Paulus et al. | 705/1 |
| 2009/0043504 A1 | 2/2009 | Bandyopadhyay et al. | |
| 2009/0204245 A1 | 8/2009 | Sustaeta et al. | |
| 2010/0152910 A1 | 6/2010 | Taft | |
| 2014/0229420 A1* | 8/2014 | Green et al. | 706/52 |

OTHER PUBLICATIONS

Sun et al ("Measuring the distance of Vegetation from powerlines using stereo vision", ISPRS 2006).*
Roper et al ("Remote Sensing and GIS Applications for Pipeline Security Assessment", 2005 ESRI User Conference Proceedings, Nov. 2005).*
Dewan et al (Evaluating Flood Hazard for Land Use Planning in Greater Dhaka of Bangladesh Using Remote Sensing and GIS Techniques, 2007).*
Yanli ("The Application of GIS and RS for Coastline change detection and risk assessment to enhanced sea level rise", 2002).*

(Continued)

*Primary Examiner* — Avinash J Yentrapati
(74) *Attorney, Agent, or Firm* — John Pivnichny; Darrell L. Pogue; Kaohane & D'Alessandro PLLP

(57) ABSTRACT

An approach that detects locations of hazardous conditions within an infrastructure is provided. This approach uses satellite imagery, GIS data, automatic image processing, and predictive modeling to determine the location of the hazards automatically, thus optimizing infrastructure management. Specifically, a hazard detection tool provides this capability. The hazard detection tool comprises a detection component configured to: receive visual media containing asset location data about a set of physical assets, and hazard location data about potential hazards within a vicinity of each of the set of physical assets. The detection component further receives graphical information system (GIS) data containing asset location data about each of the set of physical assets. The hazard detection tool further comprises an analysis component configured to: analyze the visual media to determine if a hazardous condition exists for each of the set of physical assets; and apply the GIS data to the visual media to determine a location of hazardous conditions within the infrastructure.

16 Claims, 5 Drawing Sheets

(56) References Cited

OTHER PUBLICATIONS

Sohn ("Evaluating the significance of highway network links under the flood damage: An accessibility approach", 2006).*

Fleck Set Al, "Smart Camera Based Monitoring System and Its Application to Assisted Living", Proceedings of the IEEE, IEEE,. New York, US, vol. 69, No. 10, Oct. 1, 2008, pp. 1698-1714.

Eugster H. et al, "UAV-Based Augmented Monitoring—Real Time Georeferencing and Integration of Video Imagery with Virtual Globes", International Archives of Photogrammetry, Remote Sensing and Spatial Information Sciences, Beijing 2008, International Society for Photogrammetry and Remote Sensing, GB, vol. XXXVII, Jul. 3, 2008, pp. 1229-1236.

International Search Report for International Application No. PCT/EP2011/069138, dated Mar. 19, 2012.

* cited by examiner

US 8,929,585 B2

HAZARD DETECTION FOR ASSET MANAGEMENT

FIELD OF THE INVENTION

The present invention generally relates to infrastructure asset management. Specifically, the present invention provides an approach for automatically locating hazards in an infrastructure.

BACKGROUND OF THE INVENTION

Utilities companies have a significant challenge with outages, which may be caused by trees and other objects falling on overhead power lines. A significant part of the preventive maintenance budget is targeted to clearing trees. Utilities spend a significant amount of time trying to locate the exact location of tree damage that is causing a particular outage. These issues are both a financial burden and reduce the quality of service provided by utilities. Similar challenges exist with several other asset management disciplines like managing road networks, oil pipe networks, rail networks, etc., where the assessing the condition of the infrastructure and detecting potential hazards is critical to the safe and continuous operation of these infrastructures Many utilities store the location of their power lines, for example, in Geographic Information Systems (GIS). However utilities today use ad hoc manual techniques to assess where to dispatch crews, e.g., for tree trimming activity.

SUMMARY OF THE INVENTION

In one approach, there is a method for detecting locations of hazardous conditions within an infrastructure. In this approach, the method comprises: receiving visual media containing asset location data about a physical asset, and hazard location data about potential hazards within a vicinity of the physical asset; receiving graphical information system (GIS) data containing asset location data about the physical asset; analyzing the visual media to determine if a hazardous condition exists for the physical asset; and applying the GIS data to the visual media to determine a location of the hazardous condition.

In a second approach, there is a system for detecting locations of hazardous conditions within an infrastructure. In this approach, the system comprises at least one processing unit, and memory operably associated with the at least one processing unit. A hazard detection tool is storable in memory and executable by the at least one processing unit. The hazard detection tool comprises: a detection component configured to: receive visual media containing asset location data about a set of physical assets, and hazard location data about potential hazards within a vicinity of each of the set of physical assets; and receive graphical information system (GIS) data containing asset location data about each of the set of physical assets. The hazard detection tool further comprises an analysis component configured to: analyze the visual media to determine if a hazardous condition exists for each of the set of physical assets; and apply the GIS data to the visual media to determine a location of hazardous conditions within the infrastructure.

In a third approach, there is a computer program product for detecting locations of hazardous conditions within an infrastructure, the computer program product comprising a computer readable storage media, and program instructions stored on the computer readable storage media to: receive visual media containing asset location data about a set of physical assets, and hazard location data about potential hazards within a vicinity of each of the set of physical assets; receive graphical information system (GIS) data containing asset location data about each of the set of physical assets; analyze the visual media to determine if a hazardous condition exists for each of the set of physical assets; and apply the GIS data to the visual media to determine a location of hazardous conditions within the infrastructure.

In a fourth approach, there is a method for detecting locations of hazardous conditions within an infrastructure, comprising: providing a hazard detection tool within a computing infrastructure having functionality to: receive visual media containing asset location data about a set of physical assets, and hazard location data about potential hazards within a vicinity of each of the set of physical assets; receive graphical information system (GIS) data containing asset location data about each of the set of physical assets; analyze the visual media to determine if a hazardous condition exists for each of the set of physical assets; and apply the GIS data to the visual media to determine a location of hazardous conditions within the infrastructure.

Figure 1:
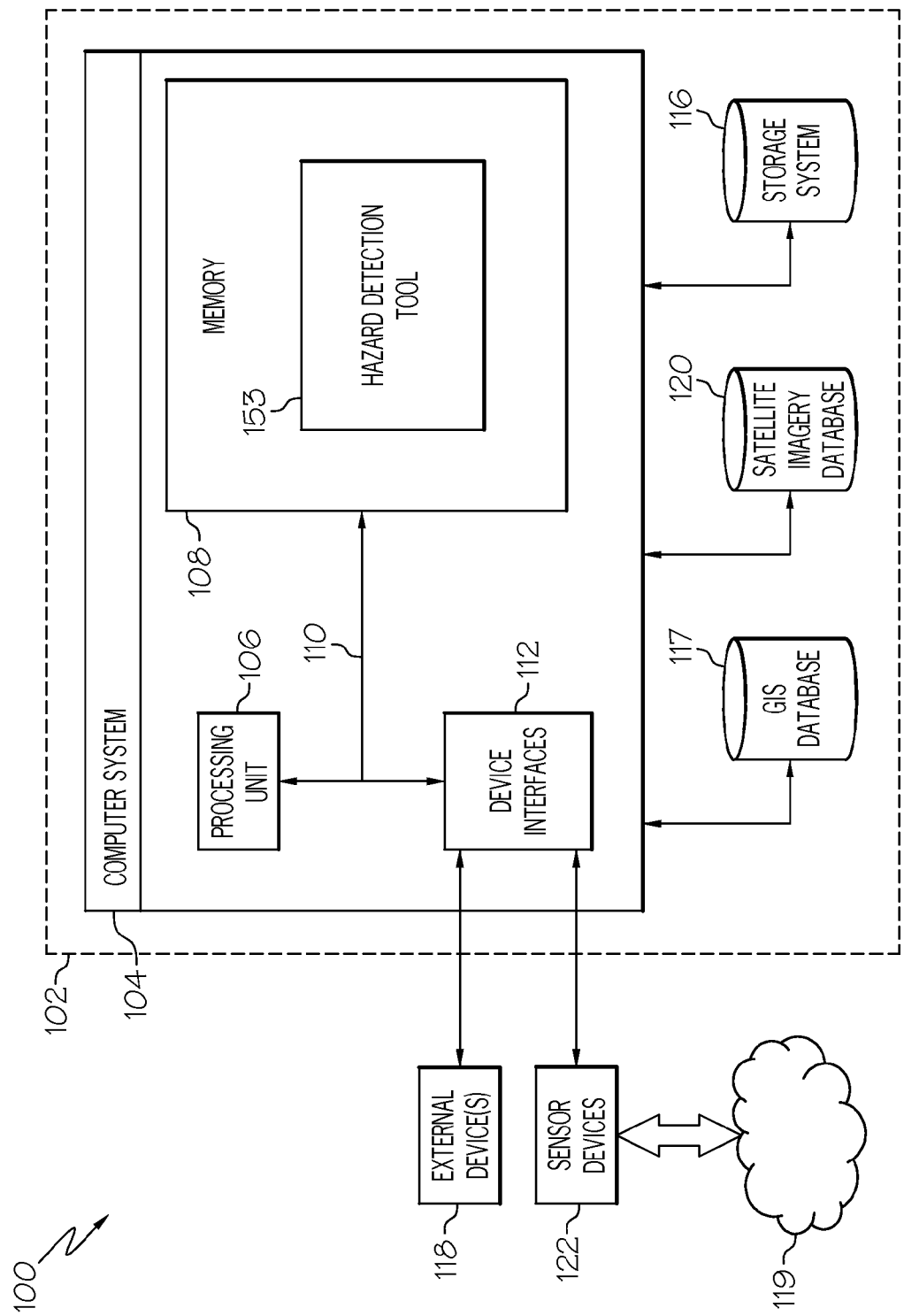
FIG. 1 shows a schematic of an exemplary computing environment in which elements of the present invention may operate.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Exemplary embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of this invention are directed to automatically detecting locations of hazardous conditions within an infrastructure. This approach uses satellite imagery, GIS data, automatic image processing, and predictive modeling to determine the location of the hazards automatically, thus optimizing preventive maintenance management. In these embodiments, a hazard detection tool provides this capability. Specifically, the hazard detection tool comprises a detection component configured to: receive visual media containing asset location data about a set of physical assets, and hazard location data about potential hazards within a vicinity of each of the set of physical assets; and receive graphical information system (GIS) data containing asset location data about each of the set of physical assets. The hazard detection tool further comprises an analysis component configured to: analyze the visual media to determine if a hazardous condition exists for each of the set of physical assets; and apply the GIS data to the visual media to determine a location of hazardous conditions within the infrastructure.

FIG. 1 illustrates a computerized implementation 100 of the present invention. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for detecting locations of hazardous conditions within an infrastructure. It should be understood that any other computers implemented under the present invention may have different components/software, but will perform similar functions. As shown, computer system 104 includes a processing unit 106 capable of analyzing satellite and GIS data, and producing a usable output, e.g., images, compressed video and video metadata. Also shown is memory 108 for storing a hazard detection tool 153, a bus 110, and device interfaces 112.

Figure 2:
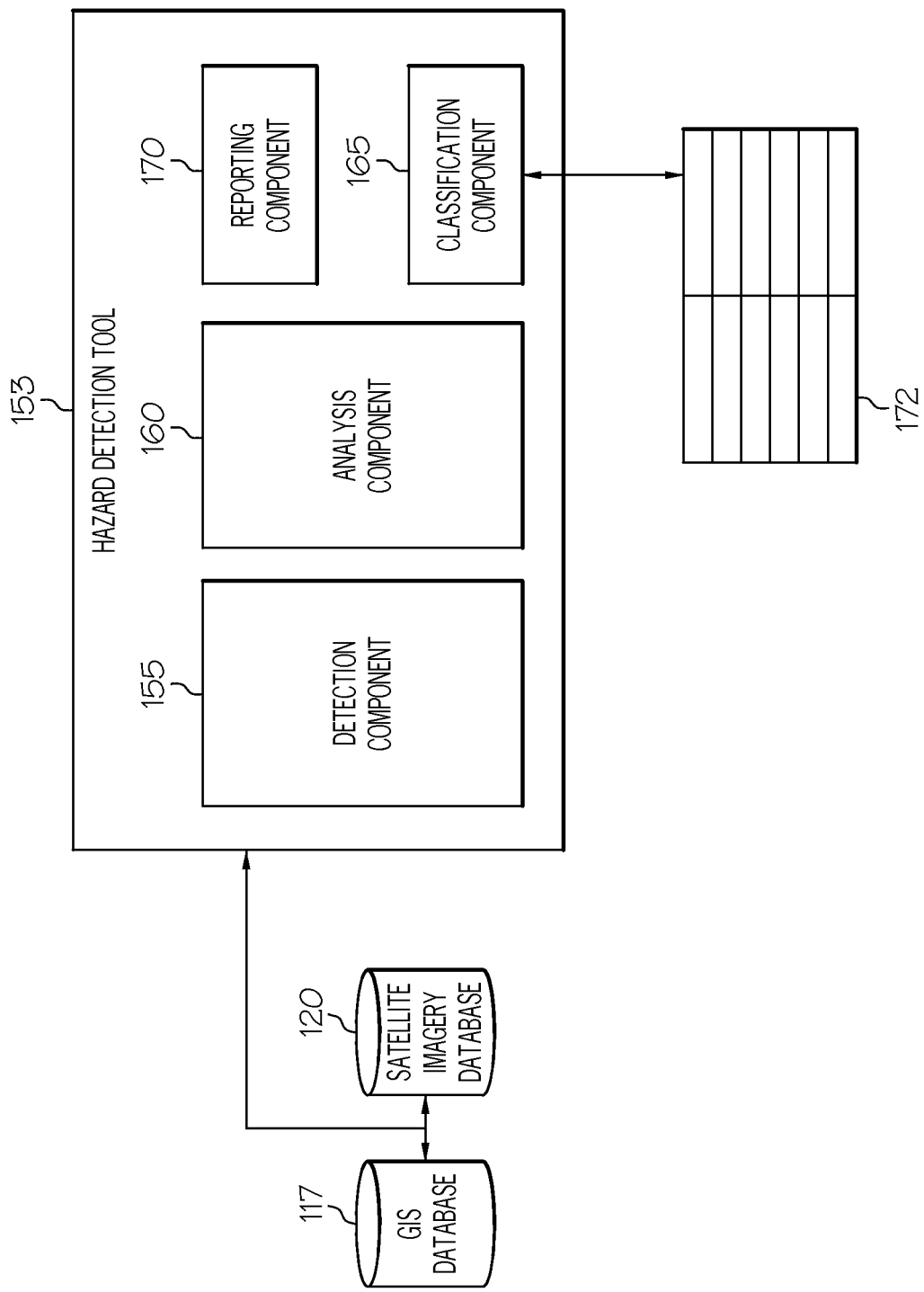
FIG. 2 shows a hazard detection tool that operates in the environment shown in FIG. 1.

Computer system 104 is shown communicating with a set (i.e., one or more) of sensor devices 122 (e.g., satellite imagery devices) that communicate with bus 110 via device interfaces 112. As shown in FIG. 2, sensor devices 122 monitor and receive visual information from a visual region of interest 119, which may include all or part of an infrastructure. In one embodiment, as will be further described below, the infrastructure may include a set of power lines operated by a utility company. Sensor devices 122 include one or more sensor devices for capturing image data representing visual attributes of assets (e.g., power lines) within the infrastructure, as well as attributes of other objects (e.g., trees) within visual region of interest 119. Sensor device 122 can include virtually any type of satellite imagery sensor capable of capturing visual attributes of objects with sufficient quality to support the methods of the invention as described herein.

Processing unit 106 (FIG. 1) collects and routes signals representing outputs from sensor devices 122 to hazard detection tool 153. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the video signals may be encrypted using, for example, trusted key-pair encryption. Different sensor systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 106 executes computer program code, such as program code for operating hazard detection tool 153, which is stored in memory 108 and/or storage system 116. While executing computer program code, processing unit 106 can read and/or write data to/from memory 108 and storage system 116. Computer system 104 also operates with a GIS database 117, which contains location data about physical assets within the infrastructure, as well as satellite imagery database 120, which stores satellite data, including visual metadata generated by processing unit 106, as well as rules against which the metadata is compared to identify objects/assets and attributes of objects present within visual region of interest 119. Storage system 116, GIS database 117, and satellite imagery database 120 can include VCRs, DVRs, RAID arrays, USB hard drives, optical disk recorders, flash storage devices, image analysis devices, general purpose computers, video enhancement devices, de-interlacers, scalers, and/or other visual or data processing and storage elements for storing and/or processing visual media and GIS data.

Although not shown, computer system 104 could also include I/O interfaces that communicate with one or more external devices 118 that enable a user to interact with computer system 104 (e.g., a keyboard, a pointing device, a display, etc.). In one embodiment, hazardous conditions within an infrastructure are output to an operator who prioritizes the dispatch of preventive maintenance personnel.

Figure 3:
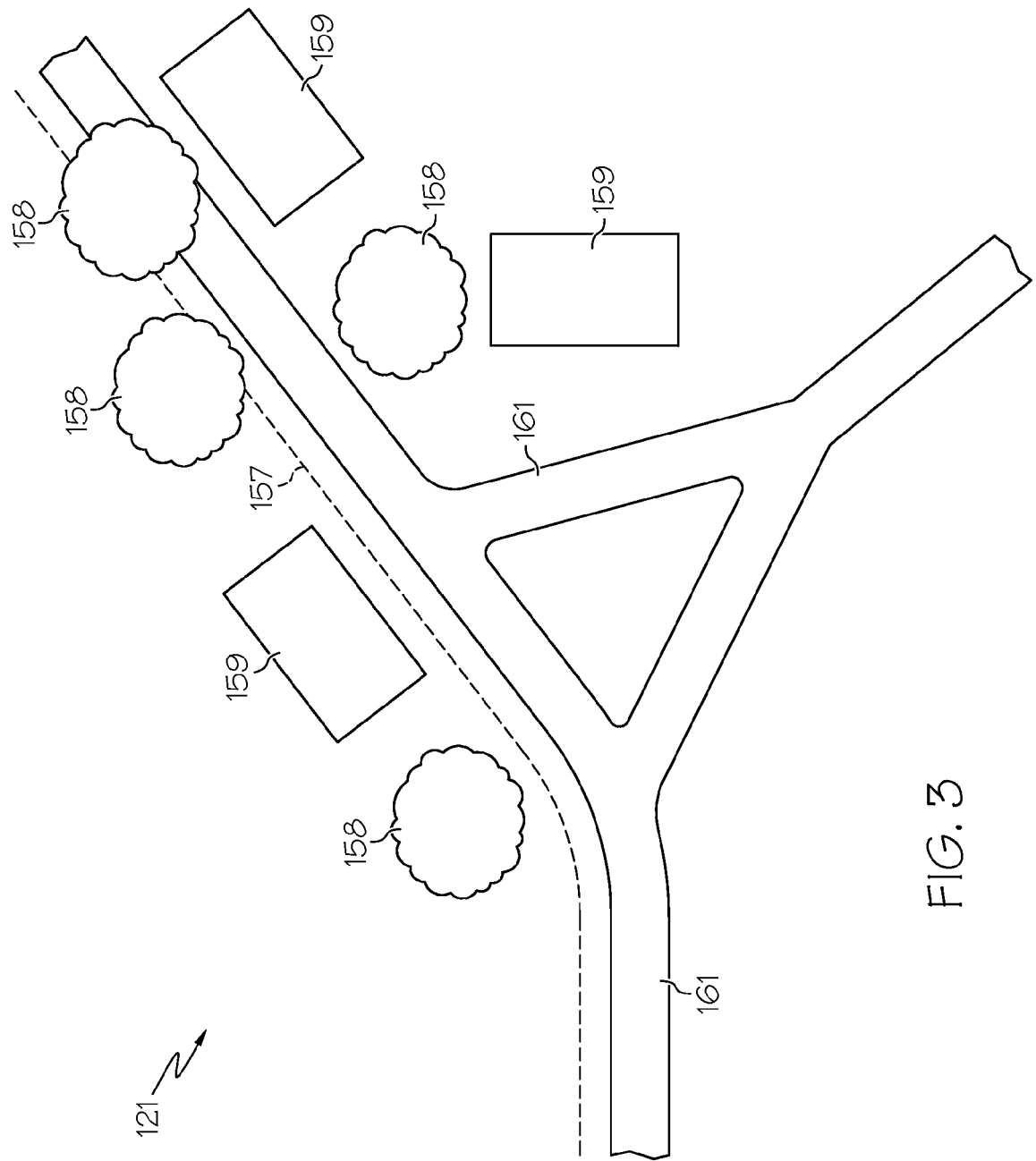
FIG. 3 shows an overhead-view representation of a set of assets within an infrastructure according to embodiments of the invention.

Turning now to FIGS. 2-3, hazard detection tool 153 according to embodiments of the invention will be described in greater detail. Hazard detection tool 153 (FIG. 2) comprises a detection component 155 configured to receive visual media 121, e.g., an overhead satellite image, which is represented in FIG. 3. As shown, visual media 121 contains asset location data about a set of physical assets 157, and hazard location data about potential hazards 158 within a vicinity of each of the set of physical assets 157. Specifically, detection component 155 receives visual media 121 (e.g., one or more satellite images via satellite imagery database 120) depicting assets 157 and hazards 158 along a roadway 161, as well as other physical structures 159, e.g., buildings. In this non-limiting example, asset 157 comprises an above-ground power line, and hazards 158 comprise trees that are within a vicinity (i.e., a predetermined distance) of the power lines. To determine whether a hazardous condition exists for each of the assets 157, that is, to determine whether the trees are within an unacceptable distance to the power lines, the satellite image is processed and analyzed. To accomplish this, detection component 153 comprises an analysis component 160 configured to analyze visual media 121 to determine if a hazardous condition exists for each of set of physical assets 157.

In one embodiment, analysis component 160 performs automatic image processing on visual media 121 to determine whether a hazardous condition exists based on the proximity of assets 157 and potential hazards 158. To accomplish this, the automatic image processing performed by analysis component 160 comprises at least one of the following: background modeling, object detection, spatial intensity field gradient analysis, line detection, and texture detection. However, it will be appreciated that many types of automatic image processing are possible within the scope of the invention to determine the location, edges, attributes, etc. of assets 157 and potential hazards 158. In one embodiment, the image processing performed by analysis component 160 may be configured to detect and locate edges or boundary positions of assets 157 and potential hazards 158 based on a number of different characteristics of the satellite image, such as texture, intensity, color, etc. The image processing performs, for example, a texture-based edge-finding operation, along with an intensity gradient edge-locating operation to determine the existence of hazardous conditions that may require attention from an operator of infrastructure based on a classification/severity of the hazardous condition. Furthermore, the automatic image processing is capable of detecting changes in tree appearance, which may indicate tree damage and the possibility of a hazardous condition.

Figure 4:
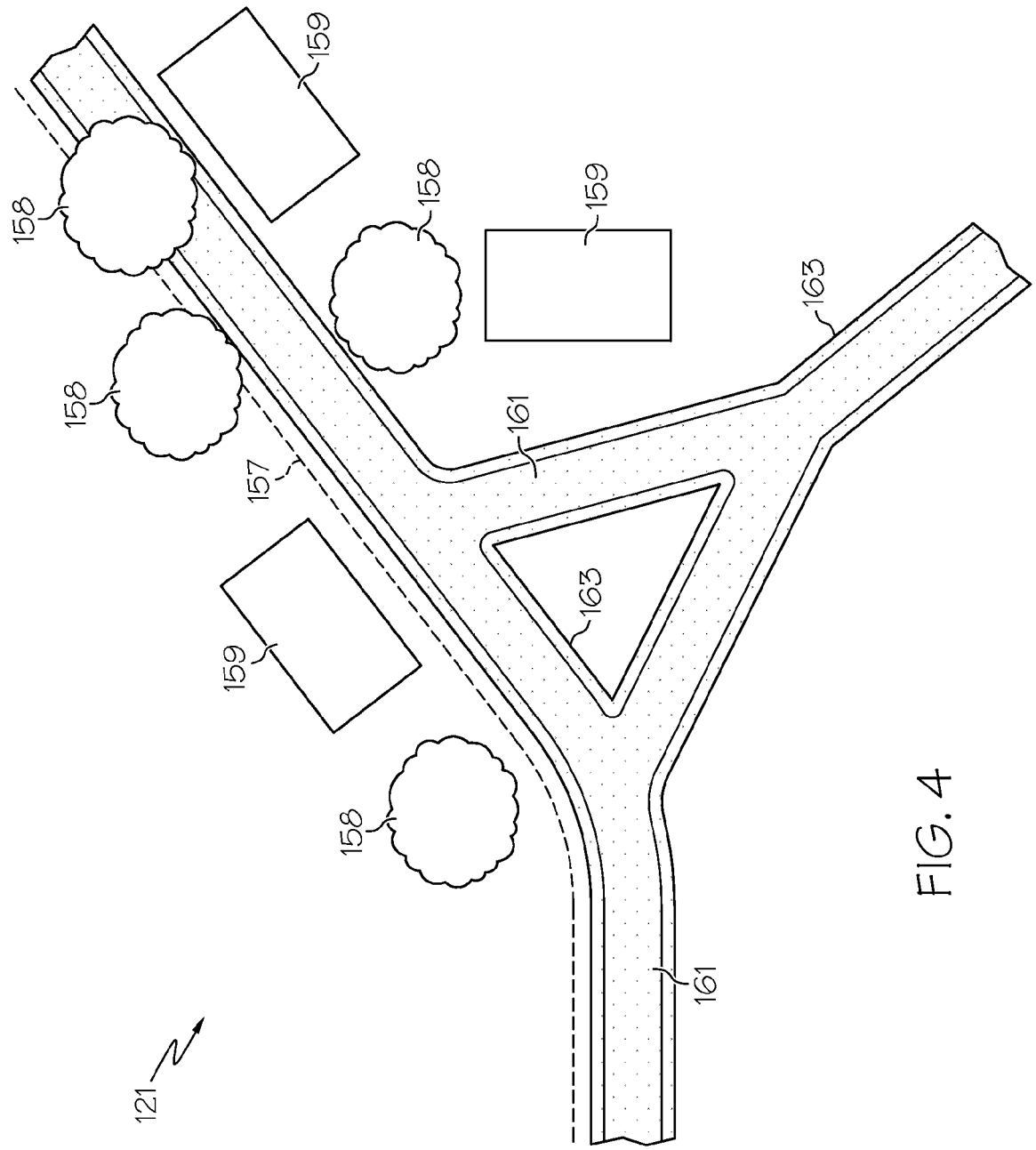
FIG. 4 shows a GIS overlay applied to the representation of a set of assets within an infrastructure according to embodiments of the invention.

Turning now to FIG. 4, an approach for determining the location of hazardous conditions based on GIS data will be described in further detail. As shown, in one embodiment, detection component 155 of hazard detection component 153 (FIG. 2) is configured to receive GIS data containing asset location information about each of set of physical assets 157. GIS data is commonly presented in the form of a visual map, which provides "layers" of information. GIS maps combine layers of information about a given asset or location, thereby providing an infrastructure operator with a better understanding of specific locations in the infrastructure. In this example, GIS data is represented as a visual overlay 163, which provides information about the location of objects such as power lines, buildings, streets, sewers, lamp posts, etc., as well as information about the objects themselves.

Analysis component 160 is configured to apply the GIS data to visual media 121 to determine a location of hazardous conditions within the infrastructure. For example, analysis component 160 may operate with a computer-executable GIS extension application interfaced with GIS database 117 to locate trees within a close proximity to the power line assets of the infrastructure. FIG. 4 illustrates such an approach, which includes visual media 121 (i.e., a satellite image) displaying basic geographic features, including assets 157 and potential hazards 158, about an area being monitored. Analysis component 160 generates visual overlay 163 containing street address information, which may be displayed, thereby presenting a detailed view of the location of infrastructure assets and hazardous conditions.

In the event that a potentially hazardous condition exists based on the analyzing, the information will be received by hazard detection tool 153 by any of various means. Again, for purposes of this disclosure, the event is assumed to be a tree in close proximity or covering a power line, or a tree with a recently changed appearance. In this embodiment, hazard detection tool 153 displays to an operator the location (e.g., the address) on the map of the potentially hazardous condition. In one embodiment, hazard detection tool 153 determines the location of relevant road intersections or traffic control points, which can be relayed to the appropriate maintenance personnel.

As shown in FIG. 2, hazard detection tool further comprises a classification component 165 configured to classify and list the location of each of the hazardous conditions. In one embodiment, classification component 165 receives a plurality of detected hazardous conditions in a ranked list 172 that is based on the severity of the hazard. For example, a section of the power line having multiple and/or large trees within a close proximity may be given priority over a section of the power line surrounded by fewer trees. Based on the severity of the hazard, any number of responses may be generated within the scope of the invention. To accomplish this, hazard detection tool 153 further comprises a response component 170 configured to generate a response based on the classification of the hazardous condition. Based on ranked list 172 providing locations of ranked by degree of hazard, response component 170 (or an infrastructure operator) prioritizes the dispatch of crews to the exact location for corrective maintenance.

It can be appreciated that the methodologies disclosed herein can be used within a computer system to detect locations of hazardous conditions within an infrastructure, as shown in FIG. 1. In this case, hazard detection tool 153 can be provided, and one or more systems for performing the processes described in the invention can be obtained and deployed to computer infrastructure 102. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

The exemplary computer system 104 may be described in the general context of computer-executable instructions, such as program modules, being executed by a computer. Generally, program modules include routines, programs, people, components, logic, data structures, and so on that perform particular tasks or implements particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Figure 5:
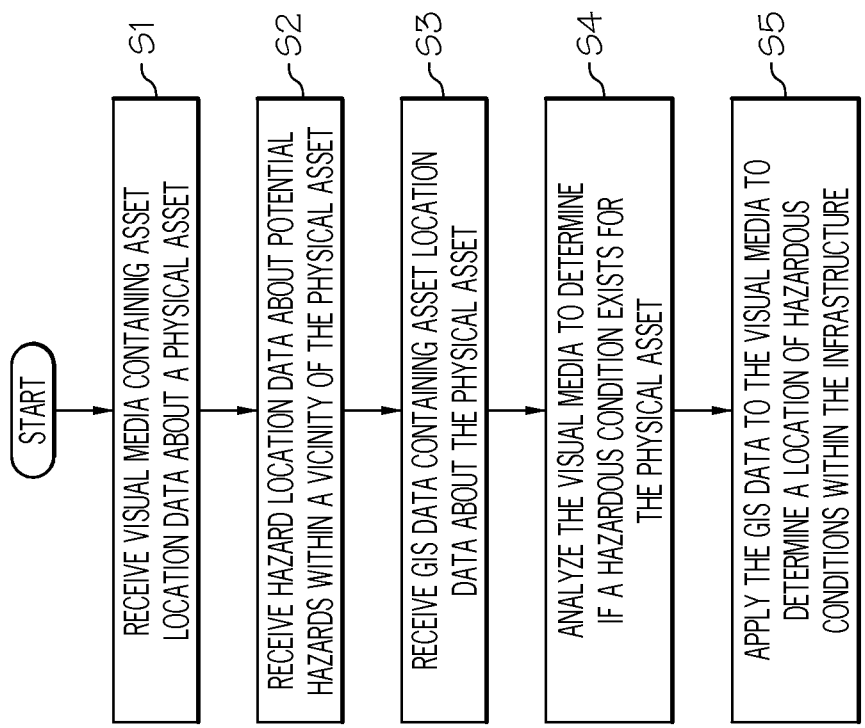
FIG. 5 shows a flow diagram of an approach for detecting hazards within an infrastructure according to embodiments of the invention.

The program modules carry out the methodologies disclosed herein, as shown in FIG. 5. According to one embodiment, at S1 visual media containing asset location data about a physical asset is received. At S2, hazard location data about potential hazards within a vicinity of the physical asset is received. At S3, GIS data containing asset location data about the physical asset is received. At S4, the visual media is analyzed to determine if a hazardous condition exists for the physical asset. At S5, the GIS data is applied to the visual media to determine a location of hazardous conditions within the infrastructure.

The flowchart of FIG. 5 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Furthermore, an implementation of exemplary computer system 104 (FIG. 1) may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for detecting locations of hazardous conditions within an infrastructure. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method for detecting locations of hazardous conditions within an infrastructure, comprising:
   receiving visual media containing asset location data about a plurality of physical assets, and hazard location data about potential hazards within a vicinity of each of the plurality of physical assets;
   receiving graphical information system (GIS) data containing asset location data about each of the plurality of physical assets;
   analyzing the visual media data to determine a hazardous condition for each of the plurality of physical assets, wherein a hazardous condition is identified in the case that an object in vicinity to one or more of the physical assets has a recent change in appearance;
   ranking each of the hazardous conditions based on severity;
   applying the GIS data to the visual media to determine a location of the hazardous conditions;
   generating a visual overlay displayed atop a satellite image of the visual media, the visual overlay including a street address displayed along with one or more of the hazardous conditions; and
   generating a maintenance plan based on the ranking of each of the hazardous conditions and the GIS data by determining a location of relevant road intersections and traffic control points based on the street address of the one or more hazardous conditions, and relaying the location of the relevant road intersections and traffic control points to maintenance personnel.

2. The method according to claim 1, the visual media comprising satellite imagery.

3. The method according to claim 1, the analyzing comprising automatic image processing.

4. The method according to claim 3, the automatic image processing comprising at least one of the following: background modeling, object detection, spatial intensity field gradient analysis, line detection, and texture detection.

5. A system for detecting locations of hazardous conditions within an infrastructure comprising:
   at least one processing unit;
   memory operably associated with the at least one processing unit; and
   a hazard detection tool storable in memory and executable by the at least one processing unit, the hazard detection tool comprising:
      a detection component containing computer instructions, which when executed, cause the system to:
         receive visual media containing asset location data about a set of physical assets, and hazard location data about potential hazards within a vicinity of each of the set of physical asset;
         receive graphical information system (GIS) data containing asset location data about each of the set of physical assets; and
      an analysis component configured to:
         analyze the visual media data to determine a hazardous condition for each of the plurality of physical assets, wherein a hazardous condition is identified in the case that an object in vicinity to one or more of the physical assets has a recent change in appearance;
         rank each of the hazardous conditions based on severity;
         apply the GIS data to the visual media to determine a location of the hazardous conditions;
         generate a visual overlay displayed atop a satellite image of the visual media, the visual overlay including a street address displayed along with one or more of the hazardous conditions; and
         generate a maintenance plan based on the ranking of each of the hazardous conditions and the GIS data by determining a location of relevant road intersections and traffic control points based on the street address of the one or more hazardous conditions, and relaying the location of the relevant road intersections and traffic control points to maintenance personnel.

6. The hazard detection tool according to claim 5, the visual media comprising satellite imagery.

7. The hazard detection tool according to claim 5, the analysis component further containing computer instructions, which when executed, cause the system to perform automatic image processing.

8. The hazard detection tool according to claim 7, the automatic image processing performed by the analysis component comprising at least one of the following: background modeling, object detection, spatial intensity field gradient analysis, line detection, and texture detection.

9. A computer program product for detecting locations of hazardous conditions within an infrastructure, the computer program product comprising a computer readable storage media, and program instructions stored on the computer readable storage media, to:
   receive visual media containing asset location data about a set of physical assets, and hazard location data about potential hazards within a vicinity of each of the set of physical asset;
   receive graphical information system (GIS) data containing asset location data about each of the set of physical assets;
   analyze the visual media data to determine a hazardous condition for each of the plurality of physical assets, wherein a hazardous condition is identified in the case that an object in vicinity to one or more of the physical assets has a recent change in appearance;
   rank each of the hazardous conditions based on severity;
   apply the GIS data to the visual media to determine a location of the hazardous conditions;
   generate a visual overlay displayed atop a satellite image of the visual media, the visual overlay including a street address displayed along with one or more of the hazardous conditions; and
   generate a maintenance plan based on the ranking of each of the hazardous conditions and the GIS data by determining a location of relevant road intersections and traffic control points based on the street address of the one or more hazardous conditions, and relaying the location of the relevant road intersections and traffic control points to maintenance personnel.

10. The computer program product of claim 9, the visual media comprising satellite imagery.

11. The computer program product of claim 9, further comprising program instructions stored on the computer readable storage media to perform automatic image processing.

12. The computer program product of claim 11, the automatic image processing comprising at least one of the following: background modeling, object detection, spatial intensity field gradient analysis, line detection, and texture detection.

13. A method comprising a computing system integrating computer-readable code stored on a computer-readable storage device, wherein the computer-readable code in combination with the computing system is capable of performing a process for detecting locations of hazardous conditions within an infrastructure, the process comprising:
   receiving visual media containing asset location data about a set of physical assets, and hazard location data about potential hazards within a vicinity of each of the set of physical asset;
   receiving graphical information system (GIS) data containing asset location data about each of the set of physical assets;
   analyzing the visual media data to determine a hazardous condition for each of the plurality of physical assets;
   ranking each of the hazardous conditions based on severity, wherein a higher ranking is assigned to the hazard condition identified as a result of the object in vicinity to one or more of the physical assets having the recent change in appearance;
   applying the GIS data to the visual media to determine a location of the hazardous conditions;
   generating a visual overlay displayed atop a satellite image of the visual media, the visual overlay including a street address displayed along with one or more of the hazardous conditions; and
   generating a maintenance plan based on the ranking of each of the hazardous conditions and the GIS data by determining a location of relevant road intersections and traffic control points based on the street address of the one or more hazardous conditions, and relaying the location of the relevant road intersections and traffic control points to maintenance personnel.

14. The method of claim 13, the visual media comprising satellite imagery.

15. The method of claim 13, the process further comprising performing automatic image processing.

16. The method of claim 15, the automatic image processing comprising at least one of the following: background modeling, object detection, spatial intensity field gradient analysis, line detection, and texture detection.

\* \* \* \* \*